United States Patent [19]
Smith

[11] Patent Number: 4,736,965
[45] Date of Patent: Apr. 12, 1988

[54] VEHICLE SUSPENSION

[75] Inventor: Roger M. Smith, Lapeer County, Mich.

[73] Assignee: The United States of America as represented by the Secretary of the Army, Washington, D.C.

[21] Appl. No.: 32,407

[22] Filed: Mar. 31, 1987

[51] Int. Cl.$^4$ .............................................. B60G 11/26
[52] U.S. Cl. ...................................... 280/714; 280/705
[58] Field of Search .................................. 280/705, 714

[56] References Cited

U.S. PATENT DOCUMENTS

| 4,050,704 | 9/1977 | Duca et al. | 280/714 |
| 4,325,443 | 4/1982 | Fischer | 180/6.54 |
| 4,396,202 | 8/1983 | Kami et al. | 280/714 |
| 4,589,675 | 5/1986 | Braun et al. | 280/714 |

Primary Examiner—Kenneth R. Rice
Attorney, Agent, or Firm—Peter A. Taucher; John E. McRae

[57] ABSTRACT

A vehicle suspension wherein hydraulic fluid is delivered to or from each suspension unit via a pilot-operated shuttle valve. Each shuttle valve is controlled by the pressure within the suspension unit, such that suspension force is maintained during jounce and rebound motions. The various shuttle valves may be located in a common manifold housing to reduce the plumbing complexity. The shuttle valves may be selectively bypassed under special circumstances, e.g., to lower the vehicle, or to facilitate vehicle turning maneuvers.

10 Claims, 4 Drawing Sheets

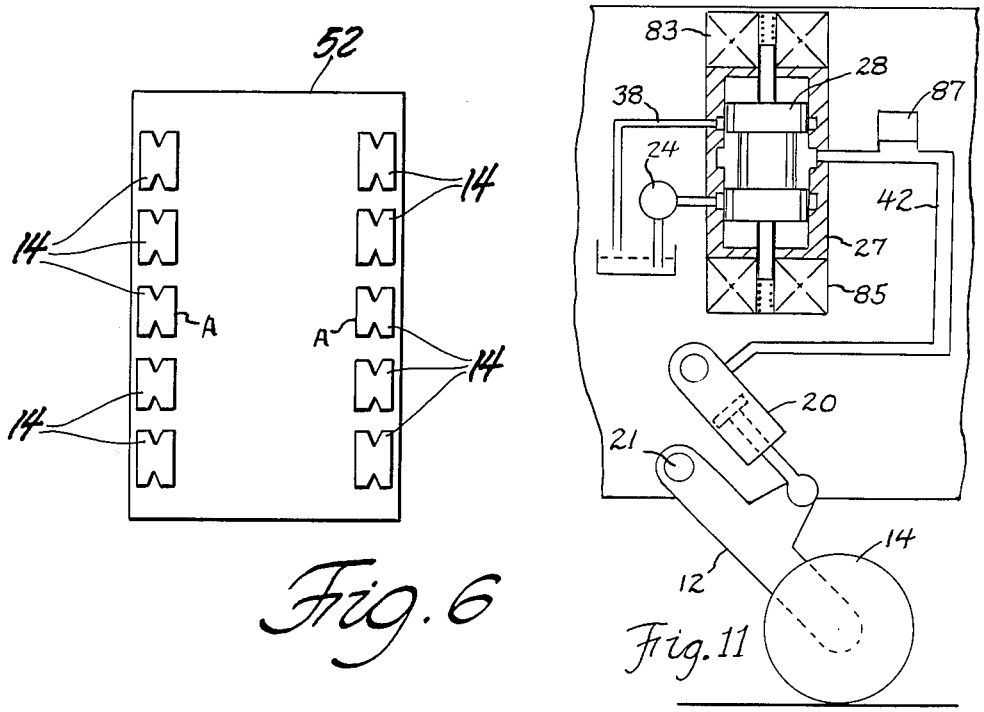
Fig. 6
Fig. 11
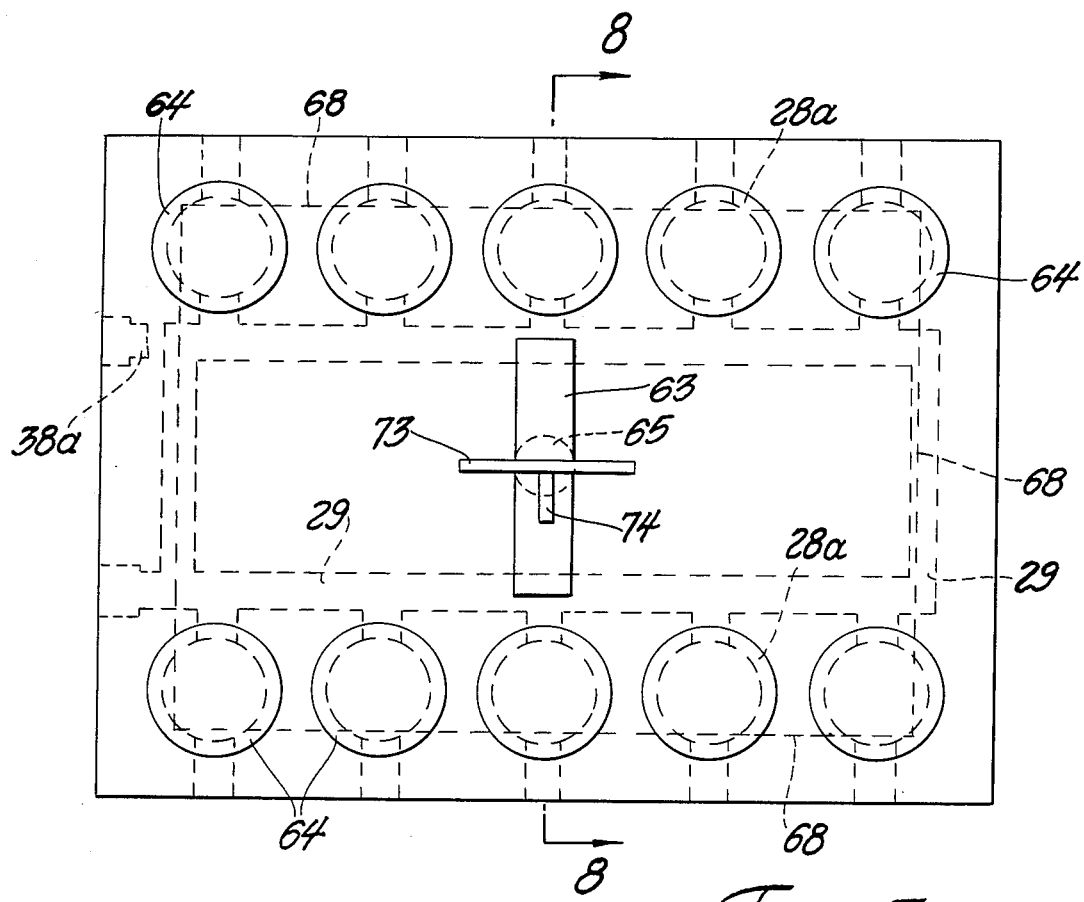
Fig. 7

4,736,965

VEHICLE SUSPENSION

GOVERNMENT INTEREST

The invention described herein may be manufactured, used, and licensed by or for the Government for governmental purposes without payment to me of any royalty thereon.

SUMMARY OF THE INVENTION

This invention relates to hydraulic wheel suspensions for vehicles, particularly military tanks. The invention is particularly designed for use on tracked vehicles, although it could conceivably be used in wheeled vehicles (military or civilian).

A principal object of the invention is to provide a wheel suspension mechanism that can be used to vary the attitude of a military vehicle (tank) in accordance with battlefield conditions, e.g., hull lowered vertically to reduce the silhouette height, front end of the hull lowered for firing on an upslope, rear end of the hull lowered for firing on a downslope, or hull tilted laterally for firing on a side slope.

Another object of the invention is to provide a suspension mechanism wherein the suspension force can be varied from wheel-to-wheel, e.g., to minimize track skidding during vehicle turning maneuvers.

A further object is to provide a relatively simple suspension mechanism wherein the suspension force is closely regulated.

THE DRAWINGS

FIG. 6 is a schematic representation of a wheel arrangement employed in conventional military tanks.

FIG. 7 is a top plan view of the structure shown in FIG. 8.

FIG. 11 is a view similar to FIG. 1, but illustrating a variant of the invention.

FIG. 1—CONSTRUCTION

Figure 1:
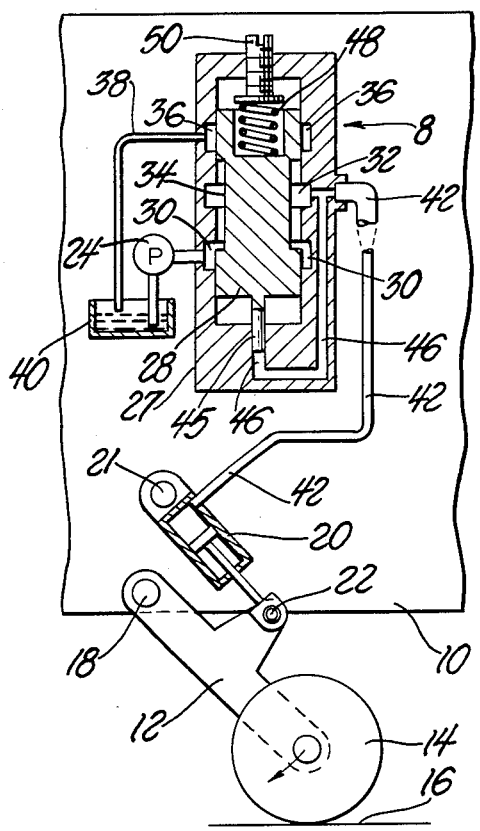
FIGS. 1, 2 and 3 are semi-structural representations of a wheel-suspension mechanism embodying my invention, showing the mechanism in three different operating modes.

FIG. 1 schematically illustrates a suspension mechanism for a vehicle hull 10. Swingable road arm 12 carries a road wheel 14 for movement along terrain surface 16. Suspension force is provided by a hydraulic wheel suspension unit 20 that comprises a conventional piston-cylinder means having pivot connections 21 and 22 with hull 10 and road arm 12, respectively. FIG. 1 shows the suspension mechanism at one wheel of the vehicle. Similar mechanisms would be provided at the other wheels.

Pressurized hydraulic liquid is supplied by a pump 24 to a pressure port 30 in a stationary housing 27 that forms part of a shuttle valve mechanism 8. A cooperating shuttle valve piston 28 is slidably positioned in housing 27 to control flow of hydraulic liquid from pressure port 30 to a second control port 32. Flow takes place through an annular groove 34 in the side surface of piston 28. When piston 28 is displaced upwardly to the FIG. 2 position groove 34 forms a liquid flow path from control port 32 to a third drain port 36. Liquid is discharged from port 36 into a line 38 leading to liquid reservoir 40.

Each of the three ports 30, 32 and 36 is shown as an annular groove in the wall of a bore formed in housing 27. In the other arrangements of FIGS. 4 and 8 the corresponding ports take the form of circular drilled holes in the housing wall surface.

The axial length of groove 34 is slightly less than the spacing between ports 30 and 36. When piston 28 is in a "centered" position displaced slightly upward from the FIG. 1 position (as shown in FIG. 3) the various ports 30, 32 and 36 are isolated from one another. Piston 28 can take three different positions. In its FIG. 1 position the piston communicates port 30 with port 32. In its FIG. 2 position the piston communicates port 32 with port 36. In its FIG. 3 position the piston isolates the three ports from one another.

Control port 32 communicates with one end of hydraulic line 42, whose other end is connected to hydraulic cylinder means 20. Flow through line 42 can be in either direction, i.e., from port 32 to cylinder means 20 or from cylinder means 20 to port 32.

The lower end of piston 28 carries a small diameter plunger 45 that extends into a circular section passage 46 formed in housing 27. This passage connects with hydraulic line 42, such that the pressure in the passage is approximately the same as the pressure in line 42 and wheel cylinder means 20. Hydraulic pressure on the lower face of plunger 45 tends to move piston 28 upwardly from its FIG. 1 position. A compression spring 48 is engaged with the other end of the piston to exert a downward force on the piston. The actual piston position is determined by the differential between the plunger 45 force and the spring 48 force. The diameter of plunger 45 and the strength of spring 48 are selected so that when the wheel cylinder means 20 is in a normally loaded position (no wheel motion) piston 28 is in a centered position wherein port 32 is isolated from ports 30 and 36.

FIG. 1—REBOUND OPERATING MODE

FIG. 1 illustrates the position of piston 28 during the rebound mode. A relatively low pressure in line 42 produces a low force on plunger 45, thereby enabling spring 48 to move piston 28 to the FIG. 1 position. Pressurized liquid from pump 24 is transmitted through port 30 across flow groove 34 to control port 32, thereby pressurizing line 42 and wheel cylinder means 20, and producing the desired rebound motion. Eventually, the pressure build up at port 32 produces an increased pressure in passage 46, which is applied to the lower face of plunger 45. When the hydraulic force on plunger 45 exceeds the force of spring 48 piston 28 is moved to a centered position, and then to the FIG. 2 jounce position (depending on terrain conditions).

FIG. 2—JOUNCE OPERATING MODE

Figure 2:
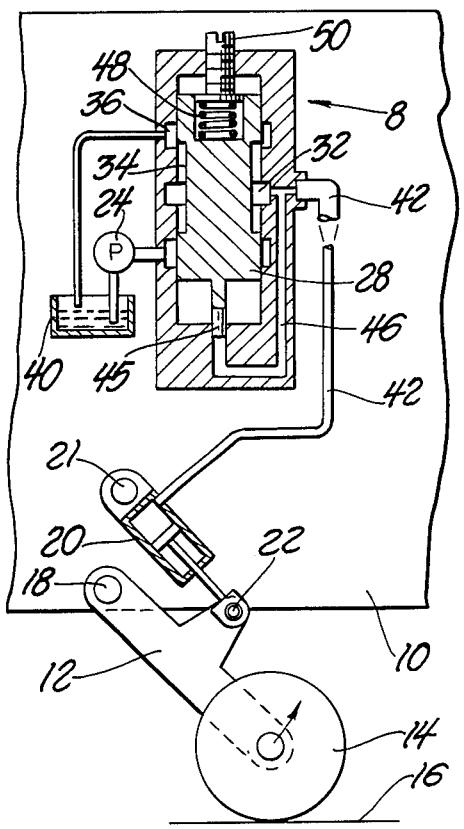
Figure 3:
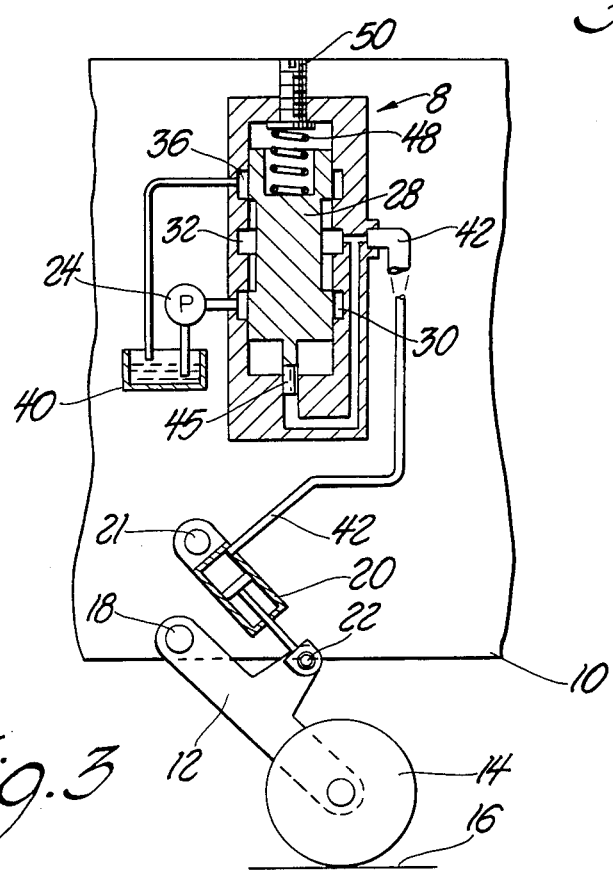

A high pressure in line 42 produces a large hydraulic force on plunger 45, thereby shifting piston 28 to the FIG. 2 position. Piston 28 has its flow groove 34 connecting port 32 to drain port 36. Pressurized liquid flows from port 32 to port 36, and eventually to reservoir 40. The reduced pressure in line 42 permits road wheel 14 to undergo a jounce motion, as denoted by the arrow in FIG. 2. As the road wheel reaches the limit of its upward movement (relative to the hull) the line 42 pressure decreases, thereby decreasing the pressure at port 32 and passage 46. Hydraulic pressure on the lower face of plunger 45 is thereby decreased. Simultaneously spring 48 is contracted (by upward movement of piston 28) so that the spring force on the piston is increased. When the downward spring force on the piston exceeds the upward force on plunger 45, piston 28 is returned to a centered position and then to the FIG. 1 position (depending on terrain conditions).

Piston 28 will be in its FIG. 1 position during rebound motion of the roadwheel; port 30 is then connected to port 32 to supply pressurized liquid to cylinder means 20. Piston 28 will be in its FIG. 2 position during jounce motion of the roadwheel; port 32 is then connected to port 36 so that liquid can flow out of cylinder means 20. When the vehicle is in a normal position (no wheel motion) piston 28 will be in a centered no-flow position (FIG. 3).

FIG. 3—HULL LOWERED MODE (REDUCED SILHOUETTE)

FIG. 3 shows the FIG. 1 mechanism, with the vehicle stationary and with spring seat member 50 adjusted upwardly (relative to the FIG. 1 position). The spring is somewhat extended so that initially it exerts a lessened force on piston 28. The piston is thereby moved up (by the liquid pressure on plunger 45) to communicate port 32 with drain port 36. Liquid is exhausted from the system to permit hull 10 to move downwardly toward terrain surface 16.

When the hull reaches a desired lowered position spring seat member 50 is manually adjusted back to its FIG. 1 condition; piston 28 will then assume a centered position.

The suspension system will thereafter operate in the previously described fashion, the only difference being that the hull has a lower "normal" position.

RETURN OF THE HULL TO ITS NORMAL POSITION

The vehicle hull may be elevated back to its normal position by temporarily adjusting spring seat 50 to a position lower than shown in FIG. 1. The increased force developed by spring 48 causes piston 28 to form a liquid flow path from port 30 to port 32. Pressurized liquid is admitted to cylinder means 20 to elevate hull 10 to its normal position, after which spring seat 50 is returned to its normal position (FIG. 1). The suspension system is then in normal operating condition.

FIGS. 4 AND 5

Figure 4:
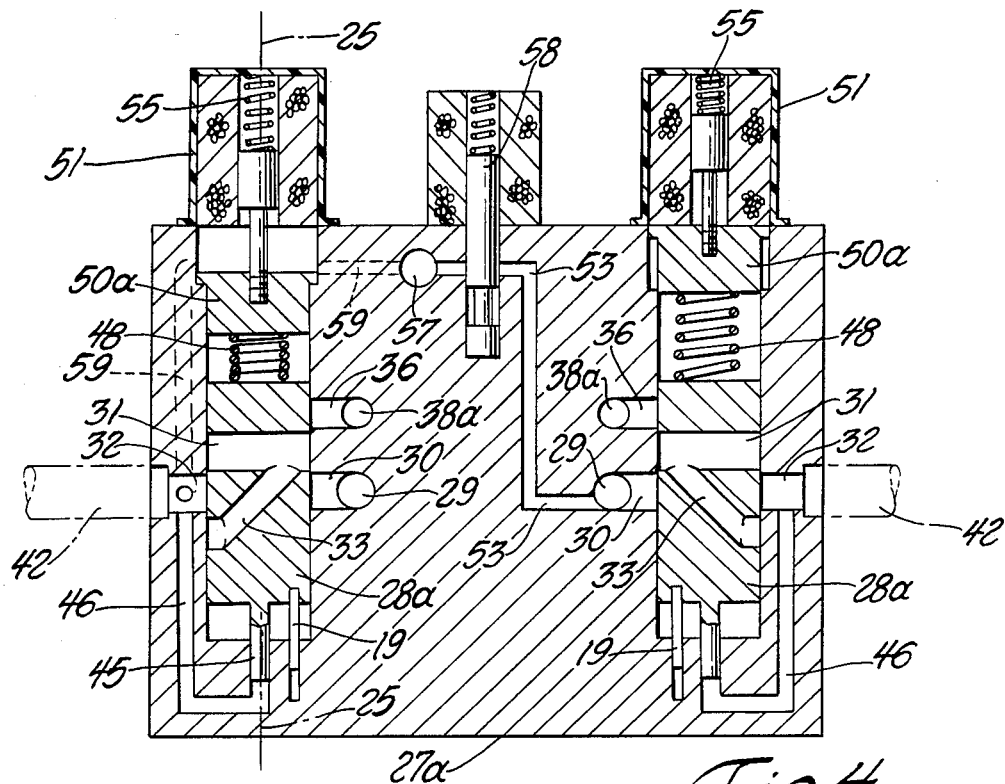
FIG. 4 is a sectional view taken on line 4—4 in FIG. 5, and illustrating another form that my invention can take.
Figure 5:
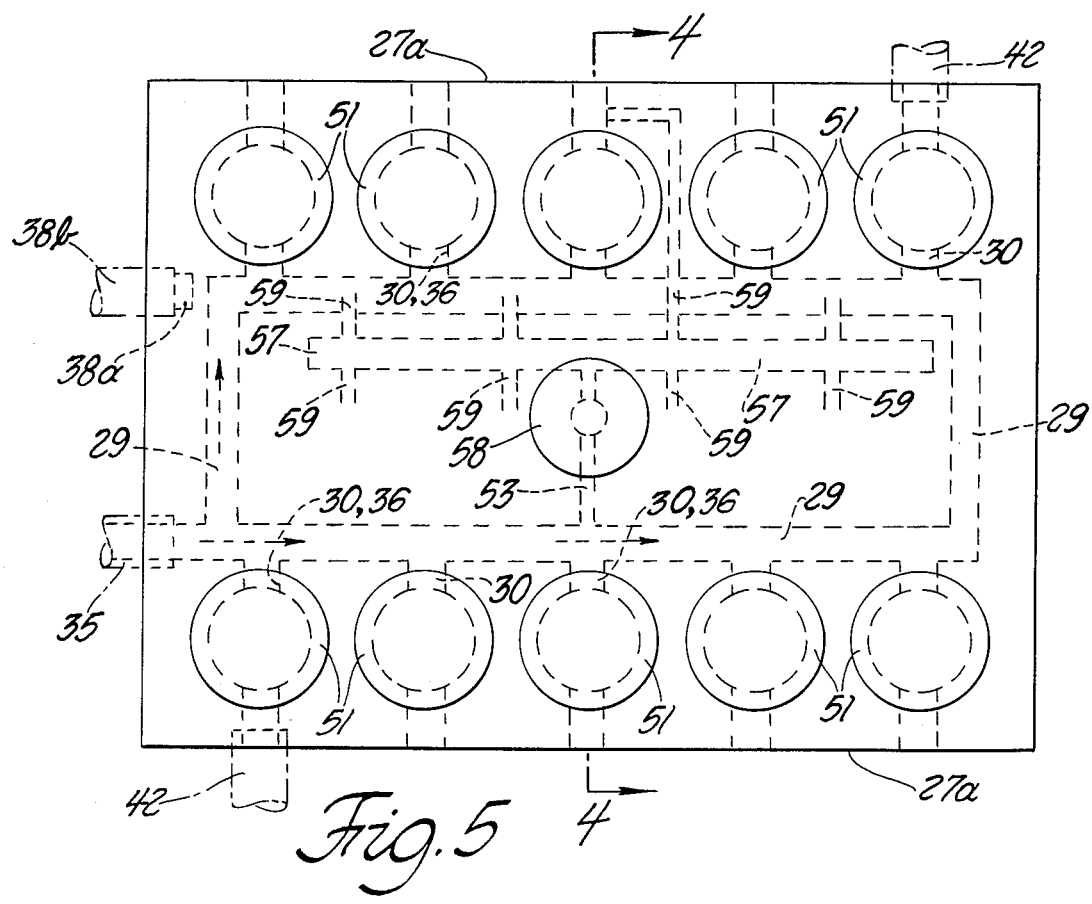
FIG. 5 is a top plan view of the structure shown in FIG. 4.

FIGS. 4 and 5 illustrate a shuttle valve mechanism constructed along the lines of the FIG. 1 mechanism, except that the FIG. 4 mechanism controls liquid flow to/from a multiple number of wheel suspension cylinders. As shown in FIG. 4, there are ten shuttle valve devices slidably disposed in a single unitary housing structure 27a. Each shuttle valve device is connectable with one of the vehicle wheels.

FIG. 6 is a diagrammatic illustration of a military tank 52 having ten road wheels 14 (five wheels at each side of the tank). The shuttle valve mechanism of FIGS. 4 and 5 could be used in the FIG. 6 vehicle, with each of the ten shuttle valve devices operatively connected to a different one of road wheels 14.

Referring to FIG. 4, each shuttle valve comprises a piston 28a having a pin 19 extending therefrom into a blind hole in housing structure 27a, to prevent rotation of the piston around its movement axis 25. A circular hole 31 extends transversely through the piston Also, a second circular hole 33 extends angularly downwardly within the piston from hole 31 to an outer side surface of the piston. Each shuttle valve system includes a spring 48, plunger 45 and passage 46. Each passage 46 communicates with a circular hole (port) 32 formed in an outer side surface of housing structure 27a. An external hydraulic line 42 extends from each port 32 to a non-illustrated wheel-suspension cylinder (similar to cylinder means 20 in FIG. 1).

Each shuttle valve is supplied with pressurized liquid through a manifold passage 29 having a flow connection with a liquid supply pipe 35 (FIG. 5). A pump (not shown) is connected to pipe 35 to move the pressurized liquid through the pipe into manifold passage 29. Each of the shuttle valves in housing structure 27a has a pressure port 30 connected to passage 29.

Housing structure 27a has ten drilled drain holes (ports) 36 therein, one for each shuttle valve. Each drain port 36 connects to a drain manifold passage 38a extending within housing structure 27a (directly above manifold passage 29). A drain pipe 38b extends from passage 38a to a non-illustrated liquid reservoir (tank).

Each compression spring 48 is trained between a piston 28a and a spring seat structure 50a. A conventional solenoid 51 is mounted on housing structure 27a above each spring seat structure 50a to adjust its position in housing structure 27a. In FIG. 4 the leftmost seat structure 50a is shown in a lowered position with the solenoid de-energized; the rightmost seat structure 50a is shown in a raised position with the associated solenoid energized. Each solenoid has a return spring 55 therein that is stronger than spring 48, such that seat structure 50a is stationary (in either of its positions).

Each shuttle valve mechanism shown in FIGS. 4 and 5 operates in generally the same fashion as the FIG. 1 mechanism. Each solenoid 51 is normally de-energized. During wheel rebound motion piston 28a moves down so that a liquid flow path is established from pressure port 30 through hole 31 to control port 32. During wheel jounce motion piston 28a moves up to establish a liquid flow path from control port 32 through hole 33 into hole 31, and thence into drain port 36.

Should it be desired to lower the vehicle hull (e.g., to reduce the height of the tank silhouette) all of the solenoids 51 are energized. With all ten spring seat structures raised, the hull will automatically be lowered toward the terrain surface, in the fashion indicated earlier in connection with FIG. 3. When the hull is lowered to a desired position all ten solenoids are de-energized to return the spring seats to their normal positions. The vehicle can then be moved, with the hull in a lowered attitude.

To elevate the hull from a lowered position to its normal position, it is necessary to introduce pressurized liquid into the suspension system. This operation can be performed by flowing pressurized liquid from the high side of the system (the pump) into the various lines 42, as a bypass around each shuttle valve piston 28a. FIG. 4 illustrates some features of a bypass flow system that can be employed to elevate the hull to any desired position.

A bypass passage 53 extends within housing structure 27a from pressure manifold 29 through solenoid-operated valve 58 to an auxiliary manifold passage 57. Branch passages 59 extend from manifold 57 to the various control ports 32. Liquid flows from each port 32 into the associated wheel cylinder means, to thereby elevate the vehicle hull from its lowered position to its normal position. During normal vehicle operation valve 58 is closed; manifold 57 and the associated passages 59 are inactive, i.e., not operational parts of the system.

The hull can be tilted in a forward direction (front end down and rear end up) to facilitate firing of the main gun when the vehicle is on an upslope. The hull adjustment action involves de-energization of the solenoids associated with the front end of the vehicle (e.g., the three frontmost wheels 14 on each side of the vehicle).

The hull can be tilted in a rearward direction (front end up and rear end down) to facilitate firing of the main gun when the vehicle is on a downslope. The hull adjustment action involves de-energization of the solenoids associated with the rear end of the vehicle (e.g., the three rearmost wheels 14 on each side of the vehicle).

In similar fashion the hull can be tilted laterally for firing (or easier movement) when the vehicle is on a side slope.

FIGS. 7 THROUGH 9

Figure 8:
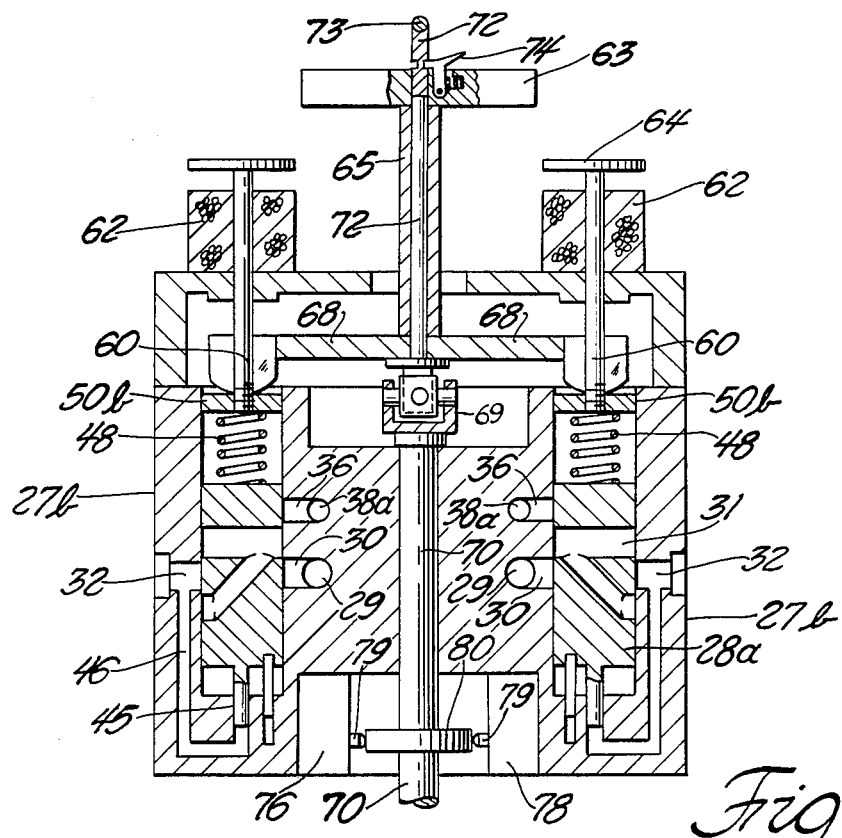
FIG. 8 is a sectional view taken on line 8—8 in FIG. 7, illustrating a further embodiment of my invention.
Figure 9:
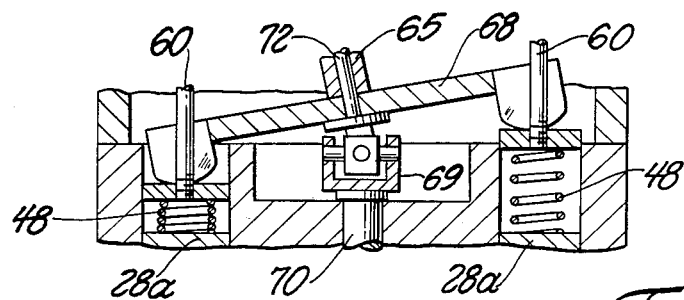
FIGS. 9 and 10 are fragmentary sectional views in the same direction as FIG. 8, but illustrating a control bar in different conditions of adjustment.

FIGS. 7 through 9 illustrate an arrangement that is generally similar to the arrangement shown in FIGS. 4 and 5, except that a joystick control mechanism is added to facilitate manual adjustment of the positions of the various spring seat structures 50b.

A floatably-mounted control bar 68 is arranged in a horizontal plane above the various spring seat structures 50b. Each spring seat structure is secured to a rod 60 that extends upwardly through a solenoid winding 62. An armature 64 is carried on the upper end of each rod 60. When the respective solenoid is de-energized rod 60 normally occupies the FIG. 8 position. When the solenoid is energized, armature 64 is drawn downwardly to move rod 60 and spring seat 50b down from the FIG. 8 position, thereby increasing the force developed by spring 48 on piston 28a.

Control bar 68 is affixed to a sleeve 65 that extends upwardly to a fixed connection with a handle 63. Manual force on handle 63 can be used to tilt bar 68 around a centrally-disposed universal joint 69 (as illustratively shown in FIG. 9). Universal joint 69 has its lower face affixed to a shaft 70 that extends downwardly through housing structure 27b. The upper face of universal joint 69 is secured to a rotary control rod 72 that extends upwardly through sleeve 65. A manual latch 74 is mounted on handle 63 to engage an annular groove in rod 72. The latch normally retains rod 72 against axial motion relative to sleeve 65. A crossbar 73 is affixed to the upper end of rod 72 for rod-turning purposes.

Figure 10:
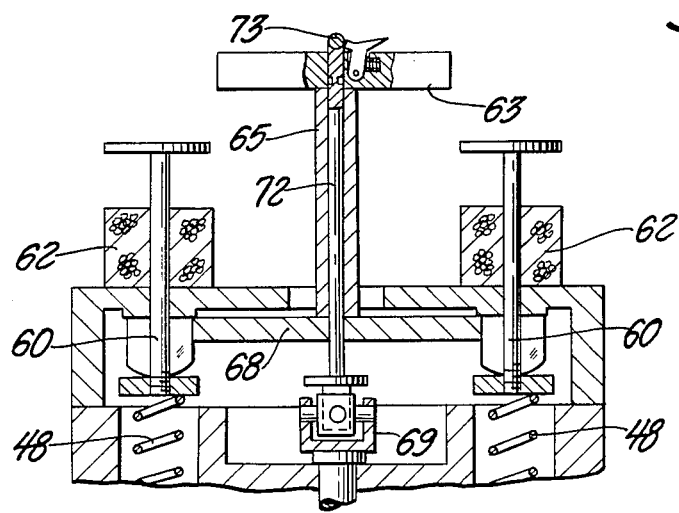

When latch 74 is disengaged from rod 72 control bar 68 is automatically displaced upwardly from its FIG. 8 position, under the impetus of springs 48. FIG. 10 illustrates the resultant condition of control bar 68; springs 48 are expanded (extended). With springs 48 extended the vehicle hull is automatically lowered toward the terrain surface, as explained previously in connection with FIG. 3. After the vehicle has been lowered to a desired position, handle 63 can be pushed downwardly to the FIG. 8 position, thereby setting the system for normal operation (with the vehicle hull having a lowered attitude). Latch 74 normally retains control bar 68 in its FIG. 8 position (against the force of springs 48).

The vehicle hull can be returned from a lowered position to a normal (elevated) position by simultaneously energizing all ten solenoid windings 62. Springs 48 are compressed to exert greater forces on the associated shuttle pistons 28a. Each piston 28a is automatically adjusted downwardly so that the associated hole 32 forms a liquid flow path from pressure port 30 to control port 32. Liquid flows into each wheel cylinder means, thereby elevating the vehicle hull to any desired position (within the limits of the cylinder means stroke).

FIG. 9 illustrates control bar 68 in a tilted position wherein the five leftmost springs 48 are compressed, and the five rightmost springs 48 are extended. This action causes the left side of the vehicle hull to be elevated (by pumping hydraulic liquid into the leftmost wheel cylinders), and the right side of the vehicle hull to be lowered (by draining liquid from the right wheel cylinders).

The action depicted in FIG. 9 is useful when the vehicle is located on a side slope; the vehicle hull can be made to assume an essentially normal attitude in spite of its side hill positionment.

Universal joint 69 permits control bar 58 to be tilted in a front-to-rear direction, thereby permitting the front (or rear) end of the vehicle to be lowered, as previously explained.

VEHICLE TURNING ASSISTANCE

During vehicle turning maneuvers, especially pivot turns, military tanks generate very high track-scuffing forces (as the heavily-loaded tracks are shifted laterally along the terrain). U.S. Pat. No 4,325,443 issued to F. C. Fischer, discloses a mechanism for temporarily increasing the suspension forces on the intermediate road wheels (i.e., the wheels located midway along the vehicle length). The mechanism shown in FIGS. 8 and 9 of the instant drawings can be utilized to achieve the advantageous turning action visualized in Fischer U.S. Pat. No. 4,325,443.

The action involves selective energization of solenoid windings 62 for the intermediate road wheels (on the right and left sides of the vehicle). As seen in FIG. 6, the "intermediate" road wheels are the wheels designated by the letter A.

Energization of each "intermediate" solenoid winding 62 enables pressurized liquid to be pumped into the associated wheel cylinder, thereby enabling that wheel to carry a higher percentage of the vehicle weight. As seen in FIG. 6, when intermediate road wheels A, A carry higher-than-normal percentages of the vehicle weight the other road wheels are more lightly loaded. During a vehicle turning maneuver the lightly-loaded tracks have lessened frictional (skid) contact with the terrain. Accordingly, the turning maneuver can be more easily accomplished, with lessened wear on the tracks.

FIG. 8 illustrates a manual means for selectively energizing the "intermediate" solenoids (for wheels A, A in FIG. 6), to facilitate a vehicle turn maneuver. The selective-energization mechanism comprises two conventional snap switches 76 and 78 suitably mounted on housing structure 27b with their actuating plungers 79 operatively engaged with a cam member 80 carried by shaft 70. Rotary motion of shaft 70 enables cam 80 to operate the associated switches 76 and 78 (simultaneously). Switch 76 energizes the left solenoid winding 62; switch 78 energizes the right solenoid winding (through non-illustrated wiring).

Shaft 70 is rotated by means of a manual turning force on cross bar 73. Rod 72 turns in sleeve 65 to exert a turning force on universal joint 69 and the associated shaft 70. Shaft 70 may have its non-illustrated end operatively engaged with a conventional vehicle steering mechanism (not shown). The aim is to energize switches 76 and 78 as an incidental part of a vehicle steer operation.

The FIG. 8 mechanism can also be used to achieve crab steering, i.e., steering on a line diagonal to the vehicle longitudinal axis. In crab steering the front road wheel on a first side of the vehicle and the rear wheel on the other (second) side of the vehicle are heavily loaded (e.g., by energizing the appropriate solenoid windings 51). Propulsion power is applied so that the tracks at the first side of the vehicle receive more power than the tracks at the second side of the vehicle. The heavily-loaded road wheel at the rear end of the second track acts as a pivot to enable the vehicle to turn slightly as it moves forward; the vehicle proceeds on a diagonal line.

The various solenoid windings 51 can be energized by one or more computer programs to achieve the desired crab steering, or pivot steering, or other vehicle maneuvers that might be necessary to facilitate accurate precise movement of the tracked vehicle around obstacles into advantageous firing positions.

FIG. 11 illustrates a variant of the FIG. 1 arrangement wherein piston 28 is operated electrically, i.e., by two solenoids 83 and 85. Piston 28 carries two plungers that serve as armatures for the solenoid windings. The solenoids are controlled by a fluid pressure-responsive switch 87. When the pressure in hydraulic line 42 sufficiently is above a predetermined value range (jounce mode) which 87 energizes solenoid 83; piston 28 is moved to a position wherein line 42 communicates with drain line 38. When the pressure in line 42 drops sufficiently below the predetermined value range (rebound mode) switch 87 energizes solenoid 85; piston 28 is moved to a position wherein pressure source 24 communicates with line 42. When the pressure in line 42 is in the predetermined range piston 28 is in a centered position, as shown in FIG. 11.

The general mode of operation of the FIG. 11 valve system is the same as that of the FIG. 1 system. In both cases the shuttle valve is operated by mechanism responsive to variations in the line 42 pressure. Each sheel could be provided with the FIG. 11 valve system; the valves could be mounted in a unitary manifold (block), as shown in FIG. 4. Manual electric switch means could be provided to program the solenoids for controlling vehicle height, vehicle attitude, etc., as described in connection with FIGS. 4 and 8.

ADVANTAGEOUS FEATURES

The suspension system incorporates mechanisms for varying the vehicle attitude, e.g., hull lowered to reduce the vehicle silhouette, hull front end lowered, hull rear end lowered, etc. Also, the mechanism includes means for pumping liquid into selected ones of the wheel cylinders to facilitate turning maneuvers. These features make the suspension especially desirable for use in tracked military vehicles (tanks and personnel carriers).

The suspension system is designed to provide a firm suspension force, even during the rebound operating mode. Each piston 28 or 28a is controlled by the force differential between the spring 48 force and hydraulic plunger 45 force. Only a relatively small change in line 42 pressure is needed to move the piston. Therefore, a high flow rate can be achieved through line 42 even though the line 42 pressure remains at or near design level. The roadwheels respond quickly to terrain irregularities without loss of vehicle suspension force.

The control units shown in FIGS. 4 and 8 can advantageously be built as relatively small size units (because each control valve 28a requires only a small operating force). Many of the flow passages are contained within housing structure 27a or 27b, thereby contributing to a small size control unit, while minimizing leakage problems.

Another advantage of the described control units is plumbing simplification. Each line 27 is a two way flow passage. Only a single drain line 38b is required. Consequently, the piping system is relatively simple.

I wish it to be understood that I do not desire to be limited to the exact details of construction shown and described, for obvious modifications will occur to a person skilled in the art, without departing from the spirit and scope of the appended claims.

I claim:

1. A vehicle suspension mechanism comprising a hydraulic cylinder means movable in one direction during wheel rebound motion, and movable in the opposite direction during wheel jounce motion; a shuttle valve means for controlling hydraulic flow to and from the hydraulic cylinder means; said shuttle valve means comprising a housing and flow control piston slidable therein on a movement axis; said housing having a first pressure port connectable to a hydraulic pressure source, a second control port connectable to the hydraulic cylinder means, and a third drain port connectable to a hydraulic drain; said flow control piston having flow passage means (34,31,33) therein; said flow control piston having a centered position wherein the three ports are isolated from one another; said piston being movable from its centered position in a first direction such that its flow passage means then commuicates said pressure port only with said control port; said piston being movable from its centered position in a second direction such that its flow passage means then communicates said second control port only with said drain port; a spring means (48) acting on the piston for moving same in the first direction; a plunger (45) extending from the piston parallel to the piston movement axis; and a second passage means communicating with the hydraulic cylinder means for sensing the cylinder means pressure; said second passage means including a pasage section (46) that slidably accommodates said plunger, whereby hydraulic pressure in said passage section exerts a hydraulic force on an end surface of the plunger; said plunger being oriented to the piston such that hydraulic force on the plunger end surface tends to move the piston in the second direction.

2. The mechanism of claim 1, and further comprising measn for adjusting the force developed by said spring means on the piston.

3. The mechanism of claim 2 wherein said force-adjusting means comprises a solenoid.

4. The mechanism of claim 3 wherein said solenoid is in axial alignment with the piston.

5. The mechanism of claim 1 wherein said spring means is engaged with one end of the piston, and said plunger is carried on the other end of the piston; the end surface area of said plunger being such that the flow control piston is in its centered position when the hydraulic cylinder means is subjected to a normal static vehicle load.

6. A vehicle suspension mechanism comprising a plural number of hydraulic cylinder units, one for each vehicle wheel; each hydraulic cylinder unit being movable in one direction during wheel rebound motion and movable in the opposite direction during wheel jounce motion; a separate shuttle valve means for controlling hydraulic flow to and from each hydraulic cylinder unit; each shuttle valve means comprising a housing and piston slidable therein on a movement axis; each said housing having a first pressure port connectable to a hydraulic pressure source, a second control port connectable to the associated hydraulic cylinder unit, and a third drain port connectable to a hydraulic drain; each flow control piston having flow passage means (34,31,33) therein; each flow control piston having a centered position wherein the associated three ports are isolated from one another; each piston being movable from its centered position in a first direction such that its flow passage means then communicates the associated pressure port only with the associated control port; each piston being movable from its centered position in a second direction such that its flow passage means then communicates the associated control port only with the associated drain port; a separate spring means acting on each piston for moving same in the first direction; a separate plunger-passage means (45,46) responsive to pressures developed in the associaed hydraulic cylinder unit for moving the associated piston in the second direction; and a floatably-mounted control bar connected to each spring means for simultaneously adjusting the spring forces developed on the associated flow control pistons.

7. The mechanism of claim 6 wherein the pistons move along parallel axes, and the control bar normally lies in a plane at right angles to the piston movement axis.

8. The mechanism of claim 7 wherein the control bar is movable in a direction parallel to the piston movement axes for simultaneously adjusting the forces developed by the spring means.

9. The mechanism of claim 8 wherein the control bar is mounted so that it can be tilted around at least one axis extending normal to the piston movement axis, whereby the spring forces can be selected adjusted.

10. The mechanism of claim 9 and further comprising a universal joint located at a central point on the control bar for enabling the control bar to be tilted in a variety of different planes extending through the rotational center of the universal joint.

* * * * *